Feb. 27, 1940.  P. K. SAUNDERS  2,191,863
FLUID CONTROL VALVE
Filed June 7, 1939
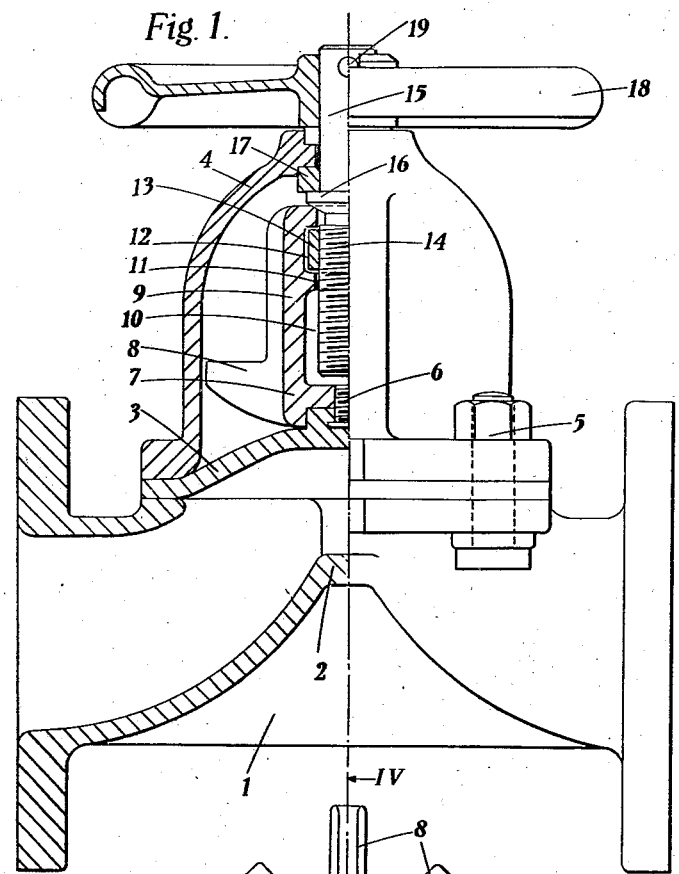
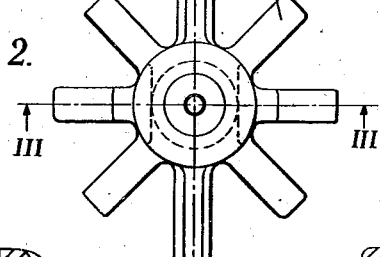
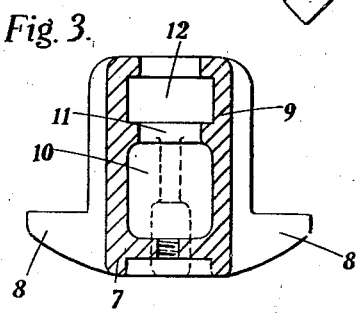
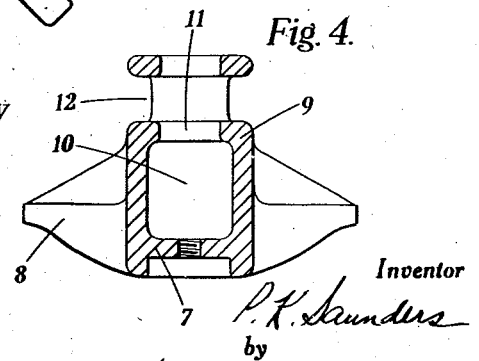
Inventor
P. K. Saunders
by
Simon H. Rhoder
Attorney Patented Feb. 27, 1940

2,191,863

UNITED STATES PATENT OFFICE 2,191,863

FLUID CONTROL VALVE

Philip Keith Saunders, Cwmbran, England

Application June 7, 1939, Serial No. 277,820
In Great Britain June 2, 1938

3 Claims. (Cl. 251—24)

This invention relates to diaphragm valves and in particular to such valves in which the body has a substantially straight through bore, intersected by a shallow weir extending across the bore, and having a concave face forming a seating for the diaphragm.

Hitherto such valves have normally been operated by means of a threaded spindle attached by a swivel pin to the actuator which moves the diaphragm, and a co-operating nut in the form of a threaded bush endwise located in the cover or bonnet by a shoulder on it bearing against the inside surface of the bonnet with the handwheel mounted on the part projecting outside the bonnet. The actuator is, of course, prevented from rotation.

In such valves the actuator has been of ferrous, and the spindle and bush of non-ferrous metal.

In addition, it has been usual to secure a washer on the top of the spindle to co-act with the hollow inside bore of the bush to prevent lubricant leaking out of the open end of the bush.

In such valves the torque required to operate the valve, and therefore the limiting operating pressure, are to a large extent governed by the amount of friction between the shoulder on the bush and the inside surface of the bonnet. It will be appreciated that the torque required to operate the valve may be of importance in some duties, for example in the case of laundries where the operator may have soapy hands.

A principal object of this invention is to reduce the torque required to operate such valves.

A further object is to cheapen manufacture of such valves by reducing the proportion of ferrous to non-ferrous metal used and by other means.

A still further object is to simplify the design of such valves.

Yet a further object is to remove the possibility of an ignorant operator injuring the valve operating mechanism internally by exerting excessive torques on the handwheel in attempting to open the valve when it is already open or to close it when it is already closed.

Another object is to effect automatic lubrication of the operating spindle and nut.

To effect these and other objects in a valve according to the invention the handwheel rotates a threaded spindle which is endwise located in the bonnet and which co-operates with a nut loosely mounted on the diaphragm actuator. As a result the thrust on the operating mechanism is taken between a collar or the like on the spindle whose diameter is less than that of the bush, let alone a collar upon the bush as in the previous design of valves, and the frictional torque resisting operation of the valve is accordingly reduced. In addition at least one part (the swivel pin) is eliminated. Moreover the part accommodating the spindle when the valve is fully opened which was previously an extension of the bush and therefore of non-ferrous metal is now an extension of the actuator and therefore of ferrous metal.

Excessive torques applied to the handwheel instead of shearing the swivel pin as in the prior valve will in a valve the subject of this invention result in shearing the pin by which the handwheel is secured to the spindle. This is of course immediately obviously from the outside.

The invention is illustrated in the accompanying drawing in which:

Fig. 1 is a view half in section of a valve in accordance with the invention.

Fig. 2 is a plan view of a diaphragm actuator in accordance with the invention.

Fig. 3 is a section on the line III—III of Fig. 2.

Fig. 4 is a section on the line IV—IV of Fig. 2.

Referring now to the drawing, the valve body 1 incorporates a weir 2 with a concave face. Opposite to the weir 2 is an opening across which a diaphragm 3 is clamped by means of the bonnet 4 secured by bolts 5 to the body 1. The diaphragm has, as usual, a stud 6 embedded in it which is screwed into the end of the actuator 7 which, adjacent to the diaphragm, is of conventional form having projecting fingers 8. On the side remote from the diaphragm, there is a hollow extension 9 somewhat longer than the full travel of the diaphragm from the fully open to the fully closed position. Thus there is a cylindrical chamber 10 within the extension approached through an opening 11 of somewhat smaller diameter than that of the chamber 10.

Near the end of the extension 9 and on the side of the opening 11 remote from the chamber 10, there is a transverse slot 12 of rectangular cross section. This slot 12 accommodates a square nut 13 of similar cross section to, but somewhat smaller than that of the slot.

This nut 13 co-acts with the threaded part 14 of a spindle whose other end 15 passes through a central hole in the top of the bonnet 4. Between the parts 14 and 15 of the spindle there is a projecting collar 16 which forms an abutment for a thrust ring 17 between it and the bonnet. A handwheel 18 is secured to the projecting end 15 of the spindle by a transverse pin 19. Due to the fact that the nut 13 is of smaller cross section than its surrounding housing, the actuator 7 will be able to swivel through small angles relatively to the spindle as is desirable.

Prior to assembly, the hollow space 10 within the extension of the actuator will be charged with a suitable quantity of lubricant, thus ensuring that each time the valve is opened and therefore the end 15 of the spindle moved fully into the chamber 10, the spindle will be lubricated and therefore will transfer lubricant to the nut 13 upon a subsequent closure of the valve.

What I claim is:

1. In a diaphragm valve, a body having an opening, a diaphragm extending across the opening, a bonnet disposed above the diaphragm, a non-rotatable backing member for actuating the diaphragm with a hollow extension on the side remote from the diaphragm longer than the travel of the diaphragm from the fully shut to the fully open position and with a transverse rectangular slot near the end remote from the diaphragm, a rectangular nut of smaller cross section than that of the slot accommodated in it with its bore in line with the hollow part of the extension, and a threaded spindle co-operating with said nut and endwise located centrally in said bonnet.

2. A diaphragm valve comprising a body having a substantially straight passage, a transverse weir intersecting the passage and having an inwardly curved face constituting a diaphragm seat, the body having an opening above the weir, a diaphragm extending across the opening, a bonnet disposed above the diaphragm, a non-rotatable backing member for actuating the diaphragm, a nut loosely mounted on the backing member, and a threaded operating spindle co-operating with the nut and endwise located centrally in the bonnet.

3. A diaphragm valve comprising a body having a substantially straight passage, a transverse weir intersecting the passage and having an inwardly curved face constituting a diaphragm seat, the body having an opening above the weir, a diaphragm extending across the opening, a bonnet disposed above the diaphragm, a non-rotatable backing member for actuating the diaphragm with a hollow extension on the side remote from the diaphragm longer than the travel of the diaphragm from the fully shut to the fully open position and with a transverse rectangular slot near the end remote from the diaphragm, a rectangular nut of smaller cross section than that of the slot accommodated in it with its bore in line with the hollow part of the extension, and a threaded spindle co-operating with the nut and endwise located centrally in the bonnet.

PHILIP KEITH SAUNDERS.